Oct. 23, 1951 V. J. YOUNG ET AL 2,572,088
ULTRA HIGH FREQUENCY CODED TRANSMITTER SYSTEM UTILIZING
STORED ENERGY RECEIVED BY THE SYSTEM
Filed Dec. 22, 1945
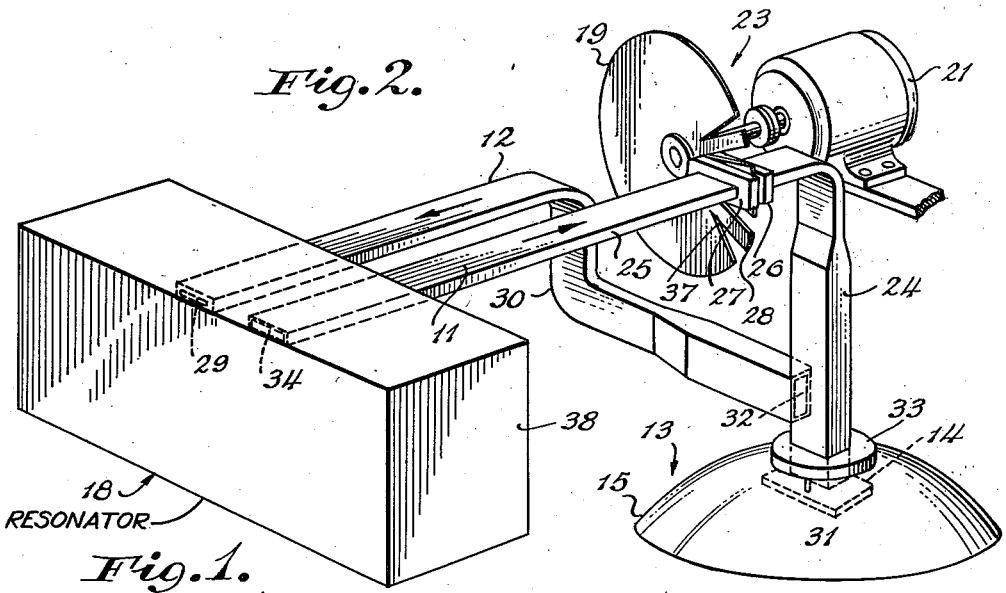
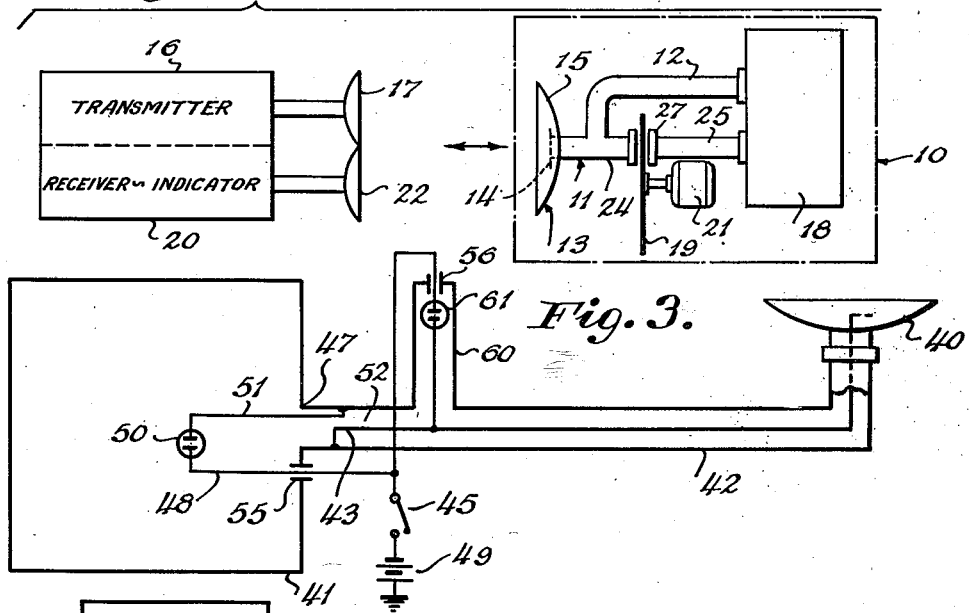
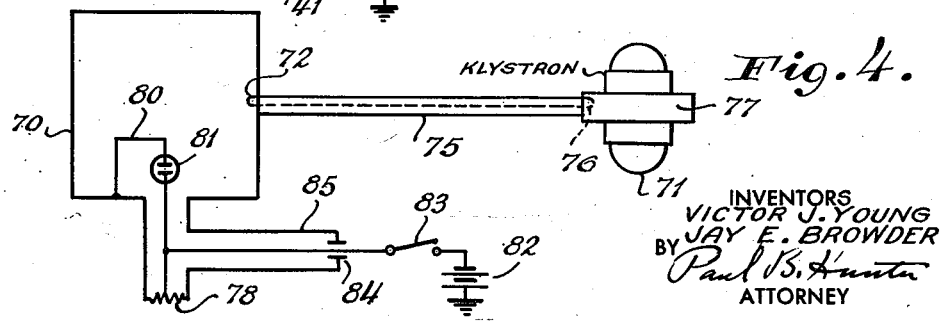
INVENTORS
VICTOR J. YOUNG
JAY E. BROWDER
BY
ATTORNEY Patented Oct. 23, 1951

2,572,088

UNITED STATES PATENT OFFICE 2,572,088

ULTRA HIGH FREQUENCY CODED TRANSMITTER SYSTEM UTILIZING STORED ENERGY RECEIVED BY THE SYSTEM

Victor J. Young, Jamaica, and Jay E. Browder, Garden City, N. Y., assignors to The Sperry Corporation, a corporation of Delaware Application December 22, 1945, Serial No. 636,995

6 Claims. (Cl. 250—8)

This invention relates generally to the generation of ultra high frequency electromagnetic energy and is more particularly concerned with those systems including apparatus and methods for accumulating and resupplying such energy.

The present invention of energy storage apparatus is adapted to accumulate radiant energy at low power levels during input time intervals which are appreciably longer than succeeding output time intervals wherein such accumulated energy is expelled at higher power levels.

The invention, therefore, has ready advantage in many radio communication systems and/or radio navigation systems wherein it is desirable to acquire large momentary power emissions after absorption of energy from a remote radiant energy source or from a direct low power generator.

In its present embodiment, the invention will be described as associated with radio navigation and identification systems which include as a component thereof a single unit combining the features of a radio energy receiver and a radio energy transmitter, known to those skilled in the art and hereinafter described as a radio "transponder."

In one such navigation and identification system there is provided a transponder which is carried by an aircraft and is designed to receive energy from a ground transmitter station projecting a "querying" beam of radio energy thereat. The transponder, as a result thereof, rebroadcasts a particularized recognition signal to the aforesaid ground station whereby its identity is revealed.

In prior recognition or identification systems the transponder used in the aircraft for the reception of the ground query necessitated multiple units of electronic equipment which included therein a separate high power supply for generating the high voltages used by the transponder to retransmit its reply to the ground station.

Thus the prohibitive weight of the transponder equipment almost exclusively restricted the use of such transponder equipment to heavy type aircraft, such as multimotored aircraft.

The present novel apparatus removes the necessity for cumbersome equipment and provides instead a simple transponder encompassing the combined functions of a storage receiver-transmitter which when necessary can be utilized without any power being generated in the aircraft at all.

The system, therefore, provides means for placing an unattended transponder in any desired position in an aircraft, such as on the underside of one of the wings of an aircraft, whereby, in fact, the identity of the craft may be determined without the knowledge or aid of its occupants.

Thus, it is an object of the present invention to provide means for generating in an energy storage device, momentary high power signals through the use of the low-power generator.

A further object of the present invention is to provide simple apparatus for use in any aircraft to enable the identification thereof.

Another object of the invention is to provide a microwave transponder adapted to retransmit intelligence upon inquiry from a microwave ground station without utilizing any other power generator for its transmitter.

Still another object of the invention is to provide a transponder adapted to retransmit intelligence upon inquiry from the ground station by utilizing the power received from the ground transmitter.

Yet another object of the present invention is to provide a transponder including an energy storage device.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Yet other objects of the invention will become apparent as afforded by the following detailed description considered in connection with the accompanying drawings, in which:

Fig. 1 is a schematic representation of a microwave transponder system in use;

Fig. 2 is a pictorial representation of one embodiment of a microwave transponder incorporating the features of the present invention;

Fig. 3 is a schematic representation of another embodiment of the present invention utilizing modified means for modulating or releasing energy stored by the transponder; and Fig. 4 is a schematic representation of the invention used for achieving momentary high output energy levels from the use of a constant low power input source of energy.

Similar reference numerals are employed to indicate corresponding parts in the above figures.

Generally speaking, the present invention concerns itself with radiant energy storage apparatus adapted to be used as low power level input energy accumulators having special utility in transponder devices used in microwave aircraft recognition systems.

Referring to Figs. 1 and 2, the microwave energy storage-transponder 10 is contained in an aircraft and combines the functions of a microwave transmitter and receiver. Separate wave guide conduits or electromagnetic energy channels 11, 12 are coupled by microwave joints 32, 33 to a single microwave antenna structure 13, containing a microwave antenna or splash plate 14 mounted on dielectric rods 31 within curved reflector or parabola 15. Energy utilized by transponder 10 is obtained at a low power level from a source, such as from a transmitter 16 situated on the ground which directs its energy toward the aircraft as by means of microwave reflector antenna structure 17.

The input energy to transponder 10 is received by microwave antenna structure 13 in the aircraft and routed by means of microwave energy conduit or wave guide 12 to microwave storage chamber 18, which may be a resonant cavity, wherein microwave energy is accumulated and released as desired in high power bursts of energy having modulation characteristics and frequencies determined by microwave energy modulator 23 and motor 21.

By means of a second microwave energy conduit or wave guide 11, the modulated energy is coupled to antenna 13 from which it is redirected to be received by microwave antenna 22 of microwave receiver indicator 20 associated with microwave transmitter 16 on the ground.

Modulator 23 is adapted to interpose a wave interceptor, reflector or shutter 19 having a multiplicity of teeth 28 arranged in accordance with a desired coding plan between juxtaposed sections 24, 25 of wave guide conduit 11 which couples resonant storage chamber 18 to antenna 13.

Thus, the flow of energy from chamber 18 may be switched on or off or may be modulated to any desired extent. This switching or modulation is achieved by varying the amount or position of that portion of reflector or shutter 19 interposed between conduit sections 24 and 25.

This variation is usually accomplished by providing relative rotation between conduit sections 24 and 25 of wave guide 11 and energy interceptor or shutter 19 by means of motor 21 rotating at a desired number of revolutions per second.

In order to prevent radiation from gap 26 formed by wave guide sections 24, 25 means for inhibiting such radiation is provided. This radiation inhibiting means may conveniently take the form of a well-known choke joint or wave trap 27 such as is described in "Practical Analysis of Ultra High Frequency," by Meagher and Markley, published by RCA Service Company, Inc., 1943.

Energy is introduced into storage resonator 18 from wave guide 12 through a narrow resonant slot or window 29 which provides a high impedance or loose coupling connection to resonant cavity 18.

Wave guide 12 is rectangular in shape and has a portion 30 thereof circularly bent or twisted in a manner so as to retain its proper width and to avoid discontinuities and reflections therein. With respect thereto, smooth bends or twists in a rectangular wave guide may be made theoretically perfect so that reflections which might be caused by making the bend, are kept to an absolute minimum provided care is taken to make the length of the twisted section greater than a wave length of the guide at the operating frequency.

Storage resonator 18 is shown as a large rectangular conducting box 38 coupled through resonant window 29 to wave guide 12 and thence to antenna 13.

The storage resonant chamber 18 need not be rectangular but may be of any desired shape which is preferable to give the desired Q to the resonant chamber, and one which will avoid degeneracy in the energy levels of the electromagnetic modes of oscillation excitable inside of the box.

Resonant chamber 18 is preferably stiffened as by suitable braces (not shown) in order to avoid microphonics due to vibration in the aircraft. As the resonant chamber 18 is made rectangular, its three dimensions are preferably made incommensurate.

It was found in satisfactorily constructing and designing resonant chamber 18, adapted to deliver high momentary output power levels from low power level inputs operative over periods of time appreciably longer than the output intervals, that although the Q of resonant chamber 18 was of major importance in the construction of the resonant cavity, it could not be said to be the full expression of the requirements for the cavity.

It was found that a low enough Q to insure charging the cavity in a few milliseconds was necessary and that this Q could be anywhere between one thousand and several million.

It was clear, as far as optimum storage properties of the cavity were concerned, that the higher the Q of the cavity the better, but that it was also found that additional storage could be obtained without effecting a higher Q.

It can be stated that the Q of a resonant cavity is the energy stored within resonant cavity divided by the energy lost to the cavity per cycle of oscillation. Thus, a cavity having a Q of 1000 has an energy storage ability that is limited by this Q of the cavity.

However, if two similar resonant cavities are connected in parallel, it is found that the amount of energy stored is twice that of the first cavity, even though the Q of the combined cavities is the same as the Q of either of the cavities, since the loss of energy per cycle is doubled as well as doubling the energy stored.

The storage capacity of resonator 18 may be thus increased without increasing the Q of the cavity by using a hollow resonant cavity that is several wave guides in length at the operating frequency.

As stated, resonant chamber 18 is excited through the high impedance coupling of resonant window 29, which couples wave guide 12 with resonant cavity 18. Because of this excitation, and as with any resonant circuit, the energy level inside cavity resonator 18 builds up with increasing time.

However, the electromagnetic energy contained within cavity 18 is unable to flow back through wave guide 12, whence it came, unless one of the energy fields, either electric or magnetic, depending upon the type of connection desired and used, is greater than the energy field thereof. Before such a condition is approximated, however, the opposing energy field builds up so as to increase the energy content within resonant chamber 18.

Transmitting channel or wave guide 11 is also coupled to resonant cavity 18 through resonant window 34 and electromagnetic energy from resonant cavity 18 is enabled to flow therethrough in accordance with the impedance loading established by modulator shutter 19 which has, as stated, a multiplicity of teeth 28 spaced at varying widths therebetween in conformity with the spacing desired for establishing the code letters of a coding plan: that is, a wide space normally represents a dash, and a narrower space represents a dot.

When none of the spaces or gaps 37 of shutter 19 is coincident with wave trap 27 of wave guide 11, then wave guide coupler or resonant window 34 represents a very high impedance or loose coupling with respect to resonant cavity 18, since, by the position of shutter 19, the resonant window 34 is effectively placed a quarter wavelength or integral multiple thereof from the low impedance point established by the closed circuit substantially effected by wave trap 27.

On the other hand, when space 37 is coincident with wave trap 27 of wave guide 11, the impedance offered to resonant cavity 18 by resonant window 34 is suddenly made very low and the resonant cavity is heavily loaded.

The result thereof is to allow the electromagnetic energy accumulated within resonant cavity 18 to flow through the transmitting channel or wave guide 11 at a high rate and to be radiated from microwave antenna 13 in a manner corresponding to the retransmission of energy at a high power level.

This radiated energy is directed toward receiver-indicator 20 on the ground and received by means of microwave antenna 22, from which signals dependent upon the code established by modulator shutter 19 are routed to a suitable indicator such as a teletype machine or other such device.

In Fig. 3 there is shown a modification of the aforedescribed transponder in which electromagnetic energy is again received from ground transmitter 16 by means of microwave antenna 40 situated on the aircraft, which routes the received energy to resonant chamber 41 by means of coaxial transmission line 42. Coaxial transmission line 42 is coupled to chamber 41 by means of a high impedance coupling or loose coupling device such as an inductive loop 43.

As desired, the coupling between resonant chamber 41 and coaxial line 42 is changed from a high impedance or loose coupling to that of a close coupling or low impedance by use of suitable switching means, preferably electronic, which when the impedance coupling between coaxial line 42 and resonant chamber 41 is to be altered, also varies the impedance match between coaxial line 42 and microwave antenna 40 by utilizing associated electronic transformation means, thus allowing the rebroadcast or retransmission of the accumulated energy previously stored by resonant chamber 41. In order to code the transmitted energy, manual or automatic switching means may be provided as by switch 45 so as to modulate the energy.

The storage-transponder device shown in Fig. 3 operates as follows: The input coupling between coaxial line 42 and resonant chamber 41 is a loose coupling or a very high impedance coupling which is provided in cavity 41 by an inductive loop 43 which terminates at a point just outside the opening of connection 47 made by means of a microwave connection between coaxial line 42 and resonant chamber 41.

A second, larger inductive loop 48 is coupled into resonant chamber 41. A neon bulb 50 or other ionizing electron discharge device having a definite firing potential is placed in series with the circuit of loop 48 so as to be activated by an external source of direct current, such as is provided by a battery 49, as desired.

If the neon tube 50 is nonactivated, the circuit of the coupling loop is non-continuous or open and, therefore, will have little effect on the operation of the input circuit 52. If neon tube 50 is activated by direct current flowing from battery 49, as by closing switch 45, the coupling loop circuit 51 is made complete and provides very close coupling between coaxial line 42 and resonant chamber 41.

Impedance-matching section 60 is effectively removed from the circuit when neon bulb 61 is nonactivated. However, when the neon tube 61 contained in matching section 60 is activated by the same external source of direct current applied to neon tube 50, then line-matching section 60 has been selected so as to give the proper impedance match between antenna 40, coaxial line 42, and resonant chamber 41, and the energy stored within chamber 41 is allowed to discharge at a rapid rate to the antenna load 40.

In order to prevent microwave radio frequency energy leakage when making the direct current connections to neon tubes 50, 61 which are included in loop 48 of resonant chamber 49 and matching section 50, radio frequency chokes 55 and 56 are provided in a manner known to those skilled in the art.

Chokes 55, 56 act essentially like short circuits to microwave frequencies, but allow the direct current voltage to be fed to neon tubes 50, 61 through the external direct current circuits without affecting any microwave circuits or surfaces. As stated, coding may be provided by opening or closing switch 45, either manually or mechanically.

In Fig. 4 there is disclosed another embodiment of the present invention by which momentary signals of very high power outputs are obtained from an input source which provides energy continuously at low power levels.

Electromagnetic energy is supplied to resonant chamber 70 by means of a low power continuous wave generating source 71, such as an electron discharge device of the velocity-modulated type, the energy from which is coupled to resonant chamber 70 at a high impedance point by means of an inductive loop coupling 72.

The output from the velocity modulated device 71 is fed to resonant chamber 70 by means of coaxial line section 75 which is connected to an output inductive loop 26 placed within the resonant chamber 77 of the velocity modulated device 71.

Resonant chamber 70 becomes charged, in a manner heretofore described, to a high energy density, the level of which is dependent upon: (1) maximum convenient volume of the cavity; (2) the desired time to the output coupling from various points of this cavity; and (3) the losses which are incurred in the cavity itself. Thus, the energy accumulated in resonant chamber 70 may be emitted or transmitted to an output load 78 in a manner such as has been described for Fig. 3.

Inductive loop circuit 80 has a neon tube 81 placed in series therewith and the direct current necessary to the activate neon tube 81 is supplied by means of battery 82 through switch 83.

As before, radio frequency choke 84, connected to matching stub 85, prevents radio frequency energy from leaking externally while allowing means for connecting direct current to neon tube 81.

In this manner, satisfactory resonant chamber structures have been built so as to give high momentary power output levels of many kilowatts strength with a few watts average input power.

Thus high power output levels, heretofore obtainable only with pulse-type magnetron devices utilizing capacitors to accumulate very high direct current voltage power levels, have been achieved.

The distinguishing feature of the present apparatus is, therefore, evident in that energy accumulations now occur at microwave frequencies rather than at direct current levels.

The advantages derivable therefrom are many and include the avoidance of high voltage direct current levels with their attendant design problems.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Microwave beacon apparatus comprising a hollow chamber having incommensurate dimensions and adapted to accumulate fields of electromagnetic energy of a plurality of frequencies, a microwave antenna for receiving electromagnetic radiation from a remote source, said antenna supplying low power energy to excite said hollow chamber, and means for radiating the accumulated energy of said hollow chamber from said antenna in high power pulses of electromagnetic energy, arranged to identify the beacon.

2. Microwave beacon comprising microwave storage means adapted to accumulate fields of electromagnetic energy, antenna means providing low power energy from a remote source for exciting said first named means, electromagnetic energy conduit means coupling said exciting means to said storage means, a second electromagnetic energy conduit means providing a path for the accumulated energy released from said storage means to said antenna means, and a modulator associated with said second conduit means for modulating said released energy in high power bursts of electromagnetic energy.

3. A radio beacon for radiating pulses of radio energy in response to radio signals transmitted thereto, comprising an antenna collecting signals to which the beacon is to respond, a cavity resonator whose dimensions are approximately several wavelengths of said energy, means including a hollow wave guide terminating in a window in the wall of said resonator coupling said antenna to said resonator to excite an oscillatory magnetic field therein and thus store the energy collected by said antenna, further means including a hollow wave guide terminating in a second window in the wall of said resonator adapted to connect said antenna to said resonator, and means connected to said last mentioned wave guide to effectively prevent its operation as a coupling device except during brief periods separated by intervals whose average lengths are much greater than those of said brief periods.

4. The invention as set forth in claim 3, wherein said last mentioned means includes a shutter in said last mentioned wave guide, and a motor driving said shutter.

5. A beacon producing a modulated emission of radio energy in response to a relatively weak received radio wave, comprising antenna means for collecting said radio wave energy, resonator means for storing said collected energy, and switching means for releasing said stored energy in short pulses at instantaneous rates which are higher than the rate of storage of said energy, said resonator comprising a rectangular chamber having incommensurate dimensions.

6. A beacon for communicating information from one location to a second location, comprising means for radiating radio energy from said second location, means for collecting said energy at said first location, resonator means for storing said collected energy as an oscillating electromagnetic field, and switching means for releasing and re-radiating said stored energy in short pulses which correspond to the information to be communicated, the instantaneous rates of release of said energy being higher than the average rate of storage thereof, said resonator means having incommensurate dimensions.

VICTOR J. YOUNG.
JAY E. BROWDER.

REFERENCES CITED

The following references are of record in the file of this patent:

UNITED STATES PATENTS

| Number | Name | Date |
|---|---|---|
| 2,333,688 | Shepard | Nov. 9, 1943 |
| 2,381,445 | Hansell | Aug. 7, 1945 |
| 2,396,044 | Fox | Mar. 5, 1946 |
| 2,403,303 | Richmond | July 2, 1946 |
| 2,403,726 | Lindenblad | July 9, 1946 |
| 2,405,814 | Brannin | Aug. 13, 1946 |
| 2,408,425 | Jenks et al. | Oct. 1, 1946 |
| 2,414,456 | Edson | Jan. 21, 1947 |
| 2,414,992 | Wheeler | Jan. 27, 1947 |
| 2,415,242 | Hershberger | Feb. 4, 1947 |
| 2,421,016 | Deloraine | May 27, 1947 |
| 2,430,568 | Hershberger | Nov. 11, 1947 |
| 2,433,868 | Sensiper | Jan. 6, 1948 |
| 2,460,827 | Isely | Feb. 8, 1949 |

OTHER REFERENCES

"Microwave Transmission Design Data," Publication No. 23–80 by the Sperry Gyroscope Company, Inc., showing prior knowledge as of May 1944 as set forth in the Commissioner's Notice of February 24, 1947, and declassified on August 1, 1945.